3,335,101
CHLORINATED POLYETHYLENE FOAM
William C. Kraemer, Jr., Cranford, and Carl R. Eckardt, Morris Plains, N.J., assignors to Allied Chemical Corporation, New York, N.Y., a corporation of New York
No Drawing. Filed Dec. 6, 1963, Ser. No. 328,520
5 Claims. (Cl. 260—2.5)

This invention relates to chlorinated polyethylene foam and the preparation thereof. More particularly this invention relates to rigid foam of a predominantly closed cell structure comprising chlorinated polyethylene having a chlorine content of at least 66% by weight.

In the past large quantities of rigid closed cell polymeric foams have been produced in which the polymer was either polystyrene or polyurethane. These polymeric foams have been widely used in insulation, floats and packaging applications. However, both polystyrene and polyurethane have serious deficiencies, particularly when the foam product is used in heat insulation. Polystyrene foam is inflammable; cannot be placed in close proximity to steam pipes or otherwise subjected to temperatures over 85° C.; will not retain blowing agents in the cells, thus seriously limiting the obtainable minimum thermal conductivity; and has poor solvent resistance. Polyurethane foam is usually inflammable and has low impact and abrasion resistance.

The present invention provides novel rigid foams comprising chlorinated polyethylenes which are nonflammable, have good abrasion and impact resistance, and will withstand temperatures of 100° C. without excessive distortion. Additionally a number of blowing agents of low thermal conductivity can be retained within the closed cells of the chlorinated polyethylene foam, thus increasing the heat insulation properties of the foam. The chlorinated polyethylene foams may be used in heat and sound insulation, floats and packaging and are particularly useful when employed as heat insulation in an application in which the insulation is subject to temperatures of 100° C. and higher.

It is therefore an object of the present invention to provide novel chlorinated polyethylene foams and methods for their preparation.

Another object of this invention is to provide chlorinated polyethylene foams which are nonflammable, have good physical properties, and are dimensionally stable at elevated temperatures.

A further object of this invention is to provide chlorinated polyethylene foam of predominantly closed cell structure wherein a gas of lower thermal conductivity than air can be retained within the cells.

Additional objects and advantages of this invention will become apparent from the following detailed description thereof.

In accordance with the present invention it has been discovered that a rigid polymeric foam of outstanding properties can be prepared from chlorinated polyethylene having a chlorine content of at least 66% by weight. These polymers are nonflammable, have a high resistance to abrasion and impact and have heat distortion temperatures of at least 100° C.

The foams of the present invention are prepared by absorbing a liquefied blowing agent in chlorinated polyethylene and then expanding the blowing agent into a gas, thereby forming cells within the polymer. For best results the chlorinated polyethylene is impregnated with blowing agent at an elevated temperature under sufficient pressure to maintain the blowing agent in at least a partially liquefied state and then the chlorinated polyethylene is either directly foamed by releasing the pressure at a temperature above the boiling point of the blowing agent, or the impregnated chlorinated polyethylene is cooled below the boiling point of the blowing agent before the environmental pressure is released to thereby give a non-cellular product which can be subsequently foamed by expanding the blowing agent.

In a preferred process particles of chlorinated polyethylene are placed in a pressure vessel which is either rotatable so as to impart a tumbling motion to said particles or is equipped with mixing means, and a liquefied blowing agent is introduced into the vessel. The vessel is then heated to a temperature in the range of 60 to 150° C., but not exceeding the glass transition temperature of the polymer, under sufficient pressure to maintain a substantial portion of the blowing agent in liquefied state. The chlorinated polyethylene particles are then mixed with blowing agent until the desired amount of blowing agent has been absorbed by the particles. The agitation during absorption step should be sufficient to prevent agglomeration of the particles, the above described tumbling of the particles being particularly effective in this respect. In preventing agglomeration, it is also important not to exceed the glass transition temperature of the polymer. After absorption of the blowing agent the particles are cooled below the boiling point of the blowing agent at atmospheric pressure, the pressure in the vessel is reduced to atmospheric and the impregnated particles removed from the vessel in an unexpanded state. In practice we have used cylindrical particles ⅛″ in diameter by ½″ long and ³⁄₁₆″ in diameter by ³⁄₁₆″ long. However, the particles can be larger or smaller and can be spherical or any other desired shape.

The chlorinated polyethylene particles impregnated with blowing agent by the absorption process may be made into foam in a number of ways. In one preferred process the particles are fed through an extruder in which the extrusion cylinder and/or stock screw are equipped with heating means and as the chlorinated polyethylene is advanced through the extrusion cylinder it is converted to a viscous melt having a temperature above the boiling point of the blowing agent absorbed therein. While the chlorinated polyethylene is confined within the extrusion cylinder, the blowing agent cannot expand and heating the blowing agent above its boiling point generates high pressures within the extruder. When the hot chlorinated polyethylene composition is forced through the extruder head into a zone of lower pressure, the blowing agent expands the resin forming a continuous log of chlorinated polyethylene. The size and shape of this log are of course a function of the extruder die.

Another method of preparing the cellular product from the above described expandable chlorinated polyethylene particles is by molding. A convenient means of accomplishing this is to partially fill a mold having gas escape openings with a sufficient quantity of expandable particles to fill the mold after foaming. After placing the particles in the mold they are heated to a temperature above the boiling point of the blowing agent absorbed therein and above the softening point of the chlorinated polyethylene to thereby expand the particles and form a cellular product having the shape of the mold. The mold is then cooled prior to removal of the molded product.

If desired a foam product can be extruded directly from chlorinated polyethylene without the intermediate step of preparing expandable particles. To directly extrude chlorinated polyethylene foam, a blowing agent is injected into melted chlorinated polyethylene as the melt is being advanced through the extrusion cylinder, and the resulting mixture is forced through the extrusion die into a zone of lower pressure, whereupon with the resulting drop in pressure, the blowing agent expands forming a cellular product.

Chlorinated polyethylenes suitable for use in the present invention should have a glass transition temperature of at least 100° C. and can be prepared by chlorinating either high pressure (branched) or low pressure (high density, essentially linear) polyethylene to a chlorine content of at least 66%. The molecular weight of the polyethylene can be varied according to the desired properties of the final product. However, when the polyethylene employed has a molecular weight of less than about 40,000, the tensile and impact strengths of the foam product are rather low. If the foam is to be made by an extrusion technique, it is best not to exceed a molecular weight of about 2,000,000 in order to avoid processing difficulties. Polyethylene having a molecular weight of up to about 5,000,000 can be used if the foam is to be prepared by a molding process. As is well known in the art, the molecular weight of the polymer can be controlled by the selection of the polymerization process used and by varying the conditions and reaction times utilized with a particular polymerization technique. Since high density, essentially linear polyethylenes having molecular weights of 40,000 and up are much more readily prepared than branched polyethylenes of such molecular weights, it is preferable to use an essentially linear polyethylene.

These essentially linear polyethylenes have densities of about 0.935 to 0.985 gm./cm.$^3$ at 20° C. and can be produced by any of the conventional low pressure ethylene polymerization processes. One procedure which has given particularly good results is to carry out a gas phase polymerization in the presence of a supported chromium activated catalyst in the manner set forth in British Patent 858,674, issued January 11, 1961, to produce a linear polyethylene having a very high molecular weight and then to partially depolymerize the polymer to the desired molecular weight by the thermal degradation process described in this British patent.

The chlorination of the polyethylene can be conducted in accordance with any of the known solution or slurry chlorination procedures capable of chlorinating polyethylene to a chlorine content of at least 66% by weight. A suitable chlorination technique is set forth in Example 3 of French Patent 1,316,044 issued December 17, 1962. The chlorinated polyethylene must have a chlorine content of 66% or more in order to obtain dimensional stability at a temperature of 100° C. The presence of more than 66% chlorine by weight imparts additional thermal stability with a chlorinated polyethylene containing 75% chlorine by weight being dimensionally stable at temperatures as high as 175° C. Although the polyethylene may be chlorinated to in excess of 80%, above about 75% chlorine the chlorination procedure becomes difficult and thus adds to the cost of the foamed product. The ability of the chlorinated polyethylene foam to withstand temperatures of 100° C. and higher is a most desirable and important property, especially when it is used as heat insulation in close proximity to steam pipes, radiators, or other heat generating fixtures. Preferably the foam contains a minimum of 68% chlorine by weight enabling the foam to withstand temperatures of up to about 115° C.

The glass transition temperature of chlorinated polyethylene as used and claimed in the present application, is a second order transition temperature which can be determined by plotting the apparent modulus of rigidity of a sample as a function of temperature and can be defined as the temperature at which the apparent modulus of rigidity of the sample possesses a value of 1.45 to 10$^4$ p.s.i. The determination can be made in accordance with ASTM test D1043–61T. In effect, the glass transition temperature is that temperature below which the chlorinated polymer remains brittle. The glass transition temperature of chlorinated polyethylene increases with increasing chlorine content. Typical glass transition temperatures for chlorinated polyethylenes suitable for the present invention are about 103° C. for 66% chlorine content, about 120° for 68% chlorine content and about 185° C. for 75% chlorine content. The maximum obtainable temperature of dimensional stability is generally a few degrees below the glass transition temperature of the polymer.

The viscosity of the chlorinated polyethylene employed varies with the molecular weight of the polyethylene which is chlorinated. The foams of the present invention can be produced from chlorinated polyethylene having an intrinsic viscosity of about 0.2 to 5.0 deciliter/gram in orthodichlorobenzene at 100° C. If the foam is to be produced by extrusion, the chlorinated polyethylene should preferably have an intrinsic viscosity of not more than about 3.5 for ease in processing. On the other hand, it is recommended that the chlorinated polyethylene used have an intrinsic viscosity of at least 0.4 in order to obtain satisfactory physical properties.

In addition to imparting thermal stability the high chlorine content renders the foam product of the present invention nonflammable. This property decreases rapidly as the chlorine content is lowered below 66% with low chlorine content foams burning readily. It is also to be noted that below a chlorine content of about 50% the chlorinated polyethylene foam is no longer rigid at room temperature and thus has no application where a self-supporting product is required.

The blowing agent may be any suitable compound inert to the chlorinated polyethylene and which will gasify or vaporize during processing such as a chlorinated aliphatic compound of 1 to 4 carbon atoms such as methyl chloride, methylene dichloride, ethyl chloride, ethylene dichloride, and n-propyl chloride; or a chlorofluoroalkane of 1 to 2 carbon atoms, such as trichloromonofluoromethane, dichlorodifluoromethane, dichlorofluoromethane, monochlorodifluoromethane, trichlorotrifluoroethane, dichlorotetrafluoroethane and chlorotrifluoroethane. Additionally, volatile hydrocarbons such as pentane and hexane and ethers such as ethyl ether and diisopropyl ether can be used as foaming agents but these compounds are not the preferred agents. Although the blowing agent may be used in an amount of about 5–50%, it is preferred to have a quantity of blowing agent from about 15% to 30% by weight of the chlorinated polyethylene absorbed in the chlorinated polyethylene at the commencement of the foaming procedure. If the chlorinated polyethylene is stored in unexpanded form for any length of time after impregnation with the blowing agent, an excess of blowing agent should be initially absorbed to allow for losses.

A particularly preferred product can be obtained when one of the above mentioned chlorofluoroalkanes is used as the blowing agent. These compounds possess the unique property of plasticizing chlorinated polyethylene at the normal extrusion temperatures thereof, which range from about 125 to 165° C., but not plasticizing chlorinated polyethylene to any appreciable extent up to a temperature of about 50° C. Thus during extrusion the chlorofluoroalkanes plasticize the chlorinated polyethylene melt thereby greatly facilitating the extrusion process, while upon cooling after the extrusion, the chlorofluoroalkanes remain entrapped in the closed cells. Since the thermal conductivity of the chlorofluoroalkanes is lower than that of air, the insulating properties of the resulting foam are superior to those obtained using a blowing agent such as methyl chloride, which diffuses through chlorinated polyethylene because of its solvent action on the polymer and thus is not retained within the cellular structure but rather is rapidly replaced by air. At present there is no known blowing agent of low thermal conductivity which can be retained within the cells of polystyrene foam and thus the chlorofluoroalkane-containing products of the present invention offer a distinct advantage over polystyrene foam with regard to heat insulation. Polystyrene foams as well as chlorinated polyethylene foams blown with a solvent have a thermal conductivity at room temperature of about 0.25 (B.t.u.)(in.)/(sq. ft.)(° F.)(hr.) while the corresponding thermal conductivity of chlorinated polyethylene foam blown with a chlorofluoroalkane is less than 0.20 even after prolonged storage.

Another feature of the chlorinated polyethylene is that any scrap material resulting from its use can be chopped up and reextruded to form new cellular logs. This offers an important advantage over other rigid foams, particularly polyurethane foam which cannot be readily reprocessed.

The foams of this invention have excellent impact resistance and abrasion resistance which are considerably higher than those of polyurethane and polystyrene foams. The superior abrasion resistance not only increases the wearing properties but greatly reduces the amount of dust formed on cutting of the cellular product.

It is not essential to incorporate a stabilizer in the foamed material. However, when a foam is produced by means of extrusion it is preferred to include a stabilizer in the expandable composition in case of exposure to excess or prolonged heating as a result of malfunctioning of the apparatus. Suitable stabilizers which may be incorporated into the chlorinated polyethylene compositions are blends including antioxidants such as 2,6-ditert.butyl-4-methylphenol and HCl acceptors such as pentaerythritol and epoxy stabilizers.

The foamed product of the present invention has a predominantly closed cell structure, i.e. at least 70% and preferably at least 80% of the cells are closed. This predominantly closed cell structure both contributes to the physical strength of the foam and makes possible the retention of low thermal conductivity gases in the foam. The density of the foams can be varied from about 1 lb./cu. ft. up to a density only slightly less than that of the unfoamed polymer from which it is prepared. However, since the cost of a given volume of foam is largely dependent on the amount of resin contained therein, for most applications it is not practical to exceed a density of 20 lbs./cu. ft. with a maximum density of 10 lbs./cu. ft. being preferred.

From the above discussion it is apparent that the chlorinated polyethylene preferably employed in the present invention is prepared from essentially linear polyethylene having a density of about 0.935 to 0.985 gm./cm.$^3$ and has a chlorine content of 68–75% by weight and an intrinsic viscosity of 0.4 to 3.5; while the preferred foam can be further characterized as having a density of from about 1 to 10 lbs. per cu. ft. and a predominantly closed cell structure in which at least 80% of the cells are closed, and containing a chlorofluoroalkane of 1 to 2 carbon atoms trapped within the closed cells.

The following examples are given to further illustrate the invention, but it is to be understood that the invention is not to be limited in any way by the details described therein. In the examples the parts are by weight.

*Example 1*

The chlorinated polyethylene resin used in this example was prepared from linear polyethylene and had a chlorine content of 68% by weight, an intrinsic viscosity of 0.6 in ortho-dichlorobenzene at 100° C. and a glass transition temperature of about 120° C. One hundred pounds of the resin were blended with a 3-component stabilizing system consisting of 1 lb. of 2,6-ditert.butyl-4-methyl-phenol, 1 lb. pentaerythritol, and 3 lbs. of an epoxy stabilizer of the formula:

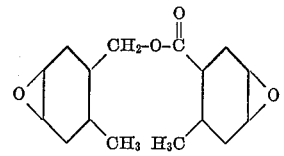

After the incorporation of the stabilizer the chlorinated polyethylene was formed into cylindrical pellets ⅛" in diameter and ½" long. A 15 lb. quantity of the pellets was placed in a pressure vessel which was rotated so as to tumble the pellets. 3.75 lbs. of liquefied trichloromonofluoromethane were added to the pressure vessel and intimately mixed with the pellets by means of the tumbling action for a period of 3 hours at a temperature of 80° C. During the mixing period pressure was kept at about 75 p.s.i.g. in order to maintain a substantial portion of the trichloromonofluoromethane in liquid phase.

The pressure vessel was next cooled to 10° C. and opened. The pellet charge was found to have absorbed 22 parts per hundred of the trichloromonofluoromethane. The pellets were extruded through a ⅛" x ¾" tape die on a 1" extruder. The heaters of the extruder were adjusted so that the temperature increased progressively from 50° C. at the feed port to 125° C. at the die. A rigid closed cell foam having a 4 lbs. per cubic foot density was obtained. The thermal conductivity of the foam at room temperature immediately after preparation was as follows: $k=0.17$ (B.t.u)(in.)/(hr.)(sq. ft.)(° F.). After the foam had aged for 15 days the thermal conductivity was measured again with no significant change being observed.

*Example 2*

500 grams of chlorinated polyethylene prepared from linear polyethylene and having a chlorine content of 72.8%, an intrinsic viscosity of 0.6 in ortho-dichlorobenzene at 100° C., and a glass transition temperature of about 159° C., was blended with stabilizer using the same stabilizer system and proportions as employed in Example 1. The stabilized chlorinated polyethylene was then formed into pellets ⁵⁄₁₆" in diameter x ⁵⁄₁₆" long. These pellets were placed in a rotatable vessel and a quantity of liquefied trichloromonofluoromethane equal to 30% by weight of the pellets was added. The pellets and trichloromonofluoromethane were admixed in the pressure vessel by tumbling for 1.5 hours at 80° C., the pressure vessel being sealed so that a substantial portion of the blowing agent was maintained in liquid phase by the generated pressure. The pressure vessel was then cooled to 10° C. and opened. The pellets were found to have absorbed 28 parts per 100 of the trichloromonofluoromethane.

The pellets were extruded into foam using the extruder of Example 1 adjusted to a temperature range of from 60° C. at the feed port to 175° C. at the die. The product obtained was a rigid closed cell foam having a density of 3.8 lbs. per cubic foot. The dimensional stability of the foam was tested at 125° C. by maintaining a strip of the foam at this temperature for 24 hours. A change in length of only 3% resulted from the test. A sample of extruded polystyrene completely degraded to a viscous mass when similarly exposed to 125° C.

*Example 3*

A flask containing 800 ml. of methylene chloride was cooled in a Dry Ice bath and then 200 grams of condensed methyl chloride were added. One kilogram of chlorinated polyethylene prepared from linear polyethylene and having a chlorine content of 73.6% by weight and an intrinsic viscosity of 0.8 in ortho-dichlorobenzene at 100° C. was blended with the mixture of methyl chloride and methylene chloride. The resulting composition consisted of an agglomerated mass which was broken into granules by passage through a Wiley Mill.

This compound was extruded into a foam using the extruder of Example 1 adjusted to a temperature range of from 75° C. at the feed port to 150° C. at the die. The product was a rigid white foam having a density of 4.5 lbs. per cubic foot with 89.4% of the cells being closed.

*Example 4*

The chlorinated polyethylene resin used in this example was prepared from linear polyethylene and had a chlorine content of 68%, an intrinsic viscosity of 0.7 in ortho-dichlorobenzene at 100° C. and a glass transition temperature of about 120° C. 400 grams of the resin were formed into cylindrical pellets ⅛" in diameter and ½" long. The pellets were mixed with 84 grams of liquefied ethyl chloride until the ethyl chloride had been absorbed.

The pellets were extruded into a rigid white foam using the extruder of Example 1 adjusted to a temperature range of from 50° C. at the feed port to 150° C. at the die. The properties of the foam are listed in the following table along with comparative data for polystyrene and polyurethane foams.

TABLE I

| | Chlorinated Polyethylene Foam | Polystyrene Foam (Extruded) | Polyurethane Foam |
|---|---|---|---|
| Density, lbs./ft.³ ᵃ | 3.4 | 3.2 | 4.0. |
| Ultimate Tensile Strength, p.s.i. ᵇ | 99 | 62 | 90. |
| Closed cells, Percent ᶜ | 90 | 90 | 90. |
| Thermal Conductivity (B.t.u.) (in.)/(hr.) (ft.²) (° F.). ᵈ | 0.23 | 0.25 | 0.15. |
| Abrasion (Foam secured to moving belt sander) | Good abrasion resistance. | Fair abrasion resistance. | Poor abrasion resistance. |
| Flammability | Slight charring, does not support combustion. | Burns | Burns. |
| Chemical resistance to gasoline (short exposure at room temperature). | No attack | Gross attack | No attack. |
| Chemical resistance to conc. HNO₃ (short exposure at room temperature). | do | No attack | Gross attack. |

ᵃ ASTM D-1622-59T.
ᵇ ASTM D-1623-59T.
ᶜ ASTM D-1940-62T.
ᵈ ASTM D-20 sub xx.

*Example 5*

Chlorinated polyethylene prepared from linear polyethylene and having a chlorine content of 68% and an intrinsic viscosity of 2.1 in ortho-dichlorobenzene at 100° C. was blended in the same stablizer system in the same proportions as in Example 1. The chlorinated polyethylene was formed into cylindrical pellets ³⁄₁₆" in diameter x ³⁄₁₆" long. These pellets were placed in a rotatable pressure vessel and a quantity of liquid trichloromonofluoromethane equal to 33% of the weight of the pellets was added. The pellets and trichloromonofluoromethane were admixed by tumbling the pellets for one and a half hours at 80° C., the pressure vessel being sealed so that a substantial portion of the trichloromonofluoromethane was maintained in liquid phase by the generated pressure. The pressure vessel was then cooled to 10° C. and opened.

The pellets were extruded into foam using the extruder of Example 1 adjusted to a temperature range of from 50° C. at the feed port to 125° C. at the die. The product obtained was a rigid closed cell foam having a density of 3.5 lbs. per cubic foot.

*Example 6*

15 pounds of chlorinated polyethylene pellets prepared from linear polyethylene and having a chlorine content of 66%, an intrinsic viscosity of 0.8 in ortho-dichlorobenzene at 100° C., and a glass transistion temperature of about 103° C., were admixed with 5.3 pounds of tri-chloromonofluoromethane in a pressure vessel following the absorption procedure of Example 1. After removal from the pressure vessel, the pellets contained 27.2 parts per 100 of the trichloromonofluoromethane blowing agent.

375 grams of the pellets were charged to a 12" x 12" x 1" mold having openings to allow for the escape of gas, the mold being pre-heated to 125° C. The pellets expanded giving a foam board having the shape of the mold.

*Example 7*

A 1" extruder of the type used in Example 1 was fitted with an inlet pipe for the injection of blowing agent between the resin feed port and the die. The temperature range of the extruder was adjusted to progressively increase from 100 to 175° C. Granules of linear chlorinated polyethylene having a chlorine content of 66% and an intrinsic viscosity of 0.6 in ortho-dichlorobenzene at 100° C., were fed through the extruder and a high pressure positive displacement pump was used to inject ethyl chloride at 2500 p.s.i.g. into the melt. A rigid white foam having a density of 5.7 pounds per cubic foot was obtained.

It will be apparent that many modifications and variations may be effected without departing from the scope of the novel concepts of the present invention, and the illustrative details disclosed are not to be construed as imposing unnecessary limitations on the invention.

We claim:
1. A rigid, nonflammable, thermoplastic, chlorinated polyethylene foam in which at least 70% of the cells are closed, said foam having a density of from about 1 to 10 lbs. per cubic foot, a thermal conductivity of less than 0.20 B.t.u./(hr.)(sq. ft.)(° F./in.) at room temperature and a chlorofluoroalkane of 1 to 2 carbon atoms permanently trapped within the closed cells, said foam comprising chlorinated polyethylene having a glass transition temperature of at least 100° C., an intrinsic viscosity of between about 0.2 to 5.0 deciliters/gram in ortho-dichlorobenzene at 100° C., and a chlorine content of at least 66% by weight.

2. A rigid foam as claimed in claim 1 wherein at least 80% of the cells are closed, the density is less than 5 lbs. per cubic foot and said chlorinated polyethylene possesses a chlorine content of 68 to 75% by weight, an intrinsic viscosity of between about 0.4 to 3.5 deciliters/gram in ortho-dichlorobenzene at 100° C. and is prepared from polyethylene having a density of about 0.935 to 0.985 grams/cm.³.

3. A rigid foam as claimed in claim 2 wherein said chlorofluoroalkane is trichloromonofluoromethane.

4. A rigid foam as claimed in claim 3 possessing a maximum thermal conductivity of about 0.17 B.t.u./(hr.) (sq. ft.) (° F./in.) at room temperature.

5. A rigid foam as claimed in claim 1 which is produced by the extrusion of a molten mixture of said chlorinated polyethylene and said chlorofluoroalkane.

References Cited

UNITED STATES PATENTS

| 2,183,556 | 12/1939 | Faucett | 260—94.9 |
| 2,387,730 | 10/1945 | Alderson | 260—2.5 |
| 2,628,945 | 2/1953 | Wayne | 260—2.5 |
| 2,948,665 | 8/1960 | Rubens et al. | 260—2.5 |
| 3,026,272 | 3/1962 | Rubens et al. | 260—2.5 |
| 3,067,147 | 12/1962 | Rubens et al. | 260—2.5 |

FOREIGN PATENTS 828,938  2/1960  Great Britain.

MURRAY TILLMAN, *Primary Examiner.*

M. FOELAK, *Assistant Examiner.*